(12) United States Patent
Taniguchi (10) Patent No.: US 6,778,593 B2
(45) Date of Patent: Aug. 17, 2004

(54) DEMODULATOR DEVICE AND DEMODULATION METHOD

(75) Inventor: Koichi Taniguchi, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 407 days.

(21) Appl. No.: 09/750,905

(22) Filed: Jan. 2, 2001

(65) Prior Publication Data

US 2001/0006532 A1 Jul. 5, 2001

(30) Foreign Application Priority Data

Jan. 5, 2000 (JP) ........................................ 2000-000257

(51) Int. Cl.⁷ .......................... H04B 15/00; H04K 1/00; H04L 27/30
(52) U.S. Cl. ...................... 375/150; 375/142; 375/343
(58) Field of Search ................................ 375/130, 142, 375/150, 143, 152, 147, 343

(56) References Cited

U.S. PATENT DOCUMENTS 5,931,893 A * 8/1999 Dent et al. .................. 708/422
6,289,000 B1 * 9/2001 Yonge, III .................. 370/203

* cited by examiner

Primary Examiner—Jean B. Corrielus
(74) Attorney, Agent, or Firm—Venable LLP; Michael A. Sartori; Daniel G. Vivarelli, Jr.

(57) ABSTRACT

A demodulator device of the present invention receives a propagation signal including a plurality of channel signals multiplexed with each other, that is modulated by using an orthogonal code sequence, through different propagation paths. The demodulator device includes propagation path estimators for performing operations including propagation path estimation and demodulates the received propagation signal by subjecting outputs of the propagation path estimators to multi-path combination. More specifically, for information obtained by correlators corresponding to operations, the demodulator device performs the multi-path combination by combining results of multiplications of the outputs of the propagation path estimators for correlation values and then separate the plurality of channels.

8 Claims, 5 Drawing Sheets

DEMODULATOR DEVICE AND DEMODULATION METHOD

BACKGROUND OF THE INVENTION

1. Field of the Invention

The present invention relates to a Code Division Multiple Access (CDMA) type demodulator device. In particular, the present invention relates to a technique for demodulating information carried by respective channel signals from an up link signal specified in the CDMA standard conforming to IS-2000.

2. Description of the Related Art

Figure 2:
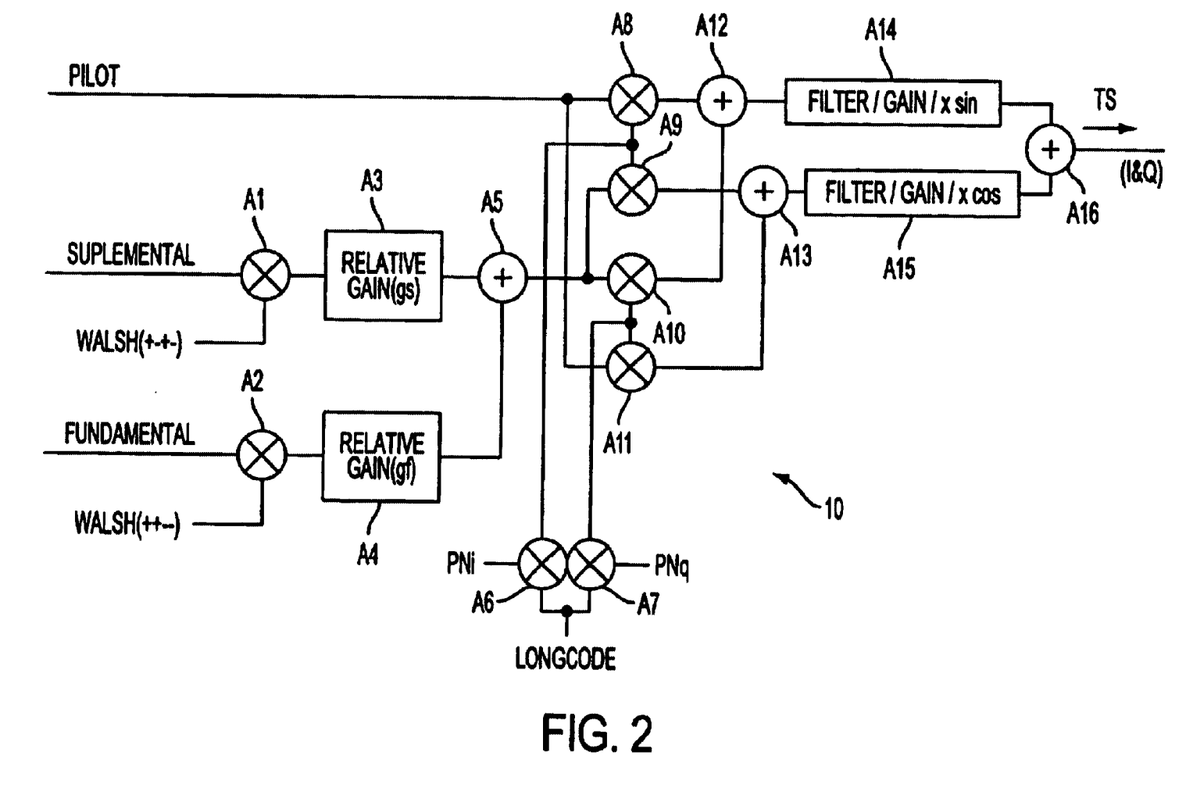
FIG. 2 is a schematic circuit diagram showing a structure of a modulator device in a conventional transmitter or a transmitter according to the embodiment of the present invention.

FIG. 2 is a circuit diagram showing an exemplary structure of a modulator device 10. The modulator device 10 is installed in a transmitter conforming to the current standard, i.e., the standard in conformity to IS-2000. The standard in conformity to IS-2000 is a standard which may be applied to CDMA receivers or cellular telecommunication systems according to CDMA modulation/demodulation techniques. The up link signal according to the standard in conformity to IS-2000 is composed of three channel signals, that is, a pilot channel signal, a supplemental channel signal and a fundamental channel signal.

In the circuit arrangement shown in FIG. 2, the modulator device 10 processes information for the pilot channel signal, information for the supplemental channel signal and information for the fundamental channel signal. The modulator device 10 includes multipliers A1 and A2, gain adjustment circuits A3 and A4, an adder A5, multipliers A6, A7, A8, A9, A10 and A11, adders A12 and A13, filter circuits A14 and A15 and an adder A16.

The multiplier A1 modulates the information for the supplemental signal with the first Walsh-Code sequence. Such a modulation is generally called as spread spectrum modulation. As a result of the modulation using the first Walsh-Code sequence, the supplemental channel signal is obtained.

The multiplier A2 modulates the information for the fundamental signal with the second Walsh-Code sequence, thereby the fundamental channel signal is obtained.

The gain adjustment circuits A3 and A4 adjust a gain of an amplitude component of the supplemental channel signal and a gain of an amplitude component of the fundamental channel signals, respectively.

The adder A5 multiplexes the supplemental channel signal output from the gain adjustment circuit A3 and the fundamental channel signal output from the gain adjustment circuit A4, so as to obtain an information channel signal.

The multiplier A6 multiplies a long-code sequence, that is a part of a PN(Pseudorandom Noise)-Code sequence, by a PN (Pseudorandom Noise)-Code sequence that corresponds to an inphase component, PNi, thereby the first orthogonal code sequence is obtained. Similarly, the multiplier A7 multiplies the above long-code sequence by a PN (Pseudorandom Noise)-Code sequence corresponding to a quadrature component, PNq, thereby the second orthogonal code sequence.

The multiplier A8 modulates the pilot channel signal carrying the information for the pilot channel signal by spread spectrum modulation using the first orthogonal code sequence output from the multiplier A6. The modulated pilot channel signal is used as an inphase component of the pilot channel signal. The multiplier A9 modulates the information channel signal output from the adder A5 by spread spectrum modulation using the first orthogonal code sequence output from the multiplier A6. The modulated information channel signal is used as a quadrature component of the information channel signal. The multiplier A10 modulates the information channel signal from the adder A5 by spread spectrum modulation using the second orthogonal code sequence output from the multiplier A7. The thus modulated information channel signal is used as an inphase component of the information channel signal. The multiplier A11 modulates the pilot channel signal with spread spectrum modulation using the second orthogonal code sequence output from the multiplier A7. The thus modulated pilot channel signal is used as a quadrature component of the pilot channel signal.

The adder A12 multiplexes the inphase component of the pilot channel signal output from the multiplier A8 and that of the information channel signal output from the multiplier A10, thereby an inphase component of a channel signal is obtained. The adder A13 multiplies the quadrature component of the pilot channel signal output from the multiplier A9 and the quadrature component of the information channel signal from the multiplier. The multiplexed signal is used as a quadrature component of the channel signal.

The filter circuit A14 adjusts the gain of the amplitude component of the inphase component of the channel signal output from the adder A12 by a low-pass filter. The filter circuit A14 rotates the phase of the adjusted signal by 90 degrees. The resultant signal is used as an inphase component of a transmitted signal TS. The filter circuit A15 adjusts the gain of the quadrature component of the channel signal output from the adder A13 by a low-pass filter. The thus adjusted signal is used as a quadrature component of the transmitted signal TS.

The adder A16 multiplexes the inphase and the quadrature components of the transmitted signal TS that are respectively output from the filter circuits A14 and A15, so as to obtain the transmitted signal TS.

As described above, the modulator device 10 modulates information for the three channel signals, i.e., information for the pilot channel signal, information for the supplemental channel signal and information for the fundamental channel signal by spread spectrum modulation using Walsh-Code sequence or spread spectrum modulation both Walsh-Code sequence and Orthogonal-Code sequence. The modulator device 10 multiplexes the modulated three channel signals to obtain the transmitted signal TS, and then transmits the transmitted signal TS.

It should be noted that the pilot channel signal is different from the supplemental channel signal that is used as the information channel signal. Also, the pilot channel signal is different from the fundamental channel signal that is used as the information channel signal. The modulator device 10 does not modulate the pilot channel signal by the spread spectrum modulation using the Walsh-Code sequence. Instead, the pilot channel signal is used for estimating a radio propagation path. When the receiver demodulates the pilot channel signal, the receiver uses a demodulation method different from that used for the supplemental channel signal and the fundamental channel signal.

Figure 3:
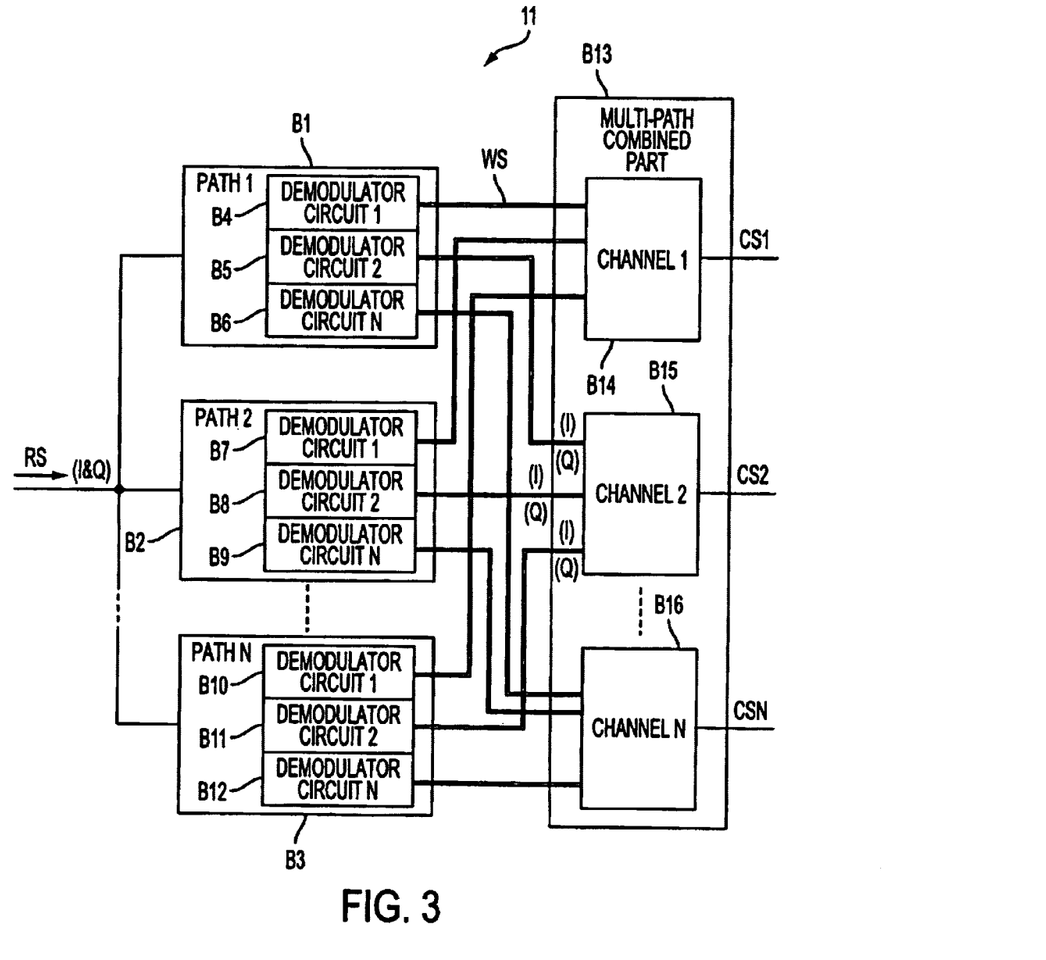
FIG. 3 is a schematic block diagram showing an entire structure of a conventional demodulator device.

FIG. 3 shows an exemplary demodulator device 11 included in the receiver. The demodulator device 11 receives the transmitted signal TS transmitted from the transmitter having the modulator device 10 as a received signal RS. The received signal RS is a signal that has passed through a propagation path composed of a multi-path fading environment. The demodulator device 11 extracts the three channel signals, i.e., the pilot channel signal, the supplemental channel signal and the fundamental channel signal from the received signal RS. The demodulator device 11 demodulates the information for the supplemental channel signal from the extracted supplemental channel signal and the information for the fundamental channel signal from the extracted fundamental channel signal.

The demodulator device 11 includes path demodulator units B1, B2 and B3. The path demodulator unit B1 corresponds to a path 1; the path demodulator unit B2 corresponds to a path 2; and the path demodulator unit B3 corresponds to a path N. These path demodulator units are finger circuits.

The path demodulator unit B1 includes demodulator circuits 1, 2 and 3 that are denoted by B4, B5 and B6, respectively so as to demodulate the channel signals 1, 2 and N in the path 1. The path demodulator unit B2 includes demodulator circuits 1, 2 and 3 that are denoted by B7, B8 and B9, respectively so as to extract the channel signals 1, 2 and N in the path 2. The path demodulator unit B3 includes demodulator circuits 1, 2 and 3 that are denoted by B10, B11 and B12, respectively so as to extract the channel signals 1, 2 and N in the path 3.

For example, the channel signal 1 corresponds to the supplemental channel signal, and the channel signal 2 corresponds to the fundamental channel signal. Thus, N=2 in this example. In the path demodulator unit B1 corresponding to the path 1, the demodulator circuit B4 extracts the supplemental channel signal while the demodulator circuit B5 extracts the fundamental channel signal. Similarly, in the path demodulator unit B2 corresponding to the path 2, the demodulator circuit B7 extracts the supplemental channel signal while the demodulator circuit B8 extracts the fundamental channel signal. In the path demodulator unit B3 corresponding to the path N, the demodulator circuit 10 extracts the supplemental channel signal while the demodulator circuit 11 extracts the fundamental channel signal.

Figure 4:
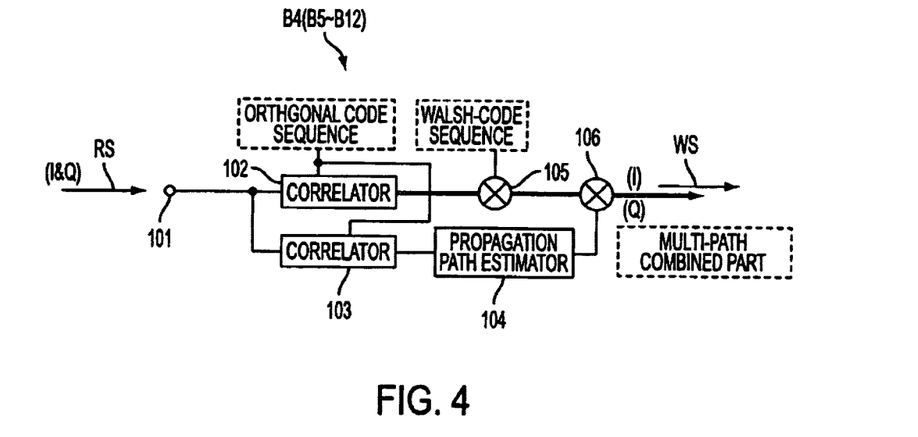
FIG. 4 is a schematic block diagram showing a structure of a conventional demodulator circuit.

FIG. 4 illustrates a configuration of the demodulator circuit B4. Please note that FIG. 4 also illustrates a configuration of each of the demodulator circuits B5–B12 since the demodulator circuits B4–B12 have the same circuit configuration. As an example, the demodulator circuit B4 of the path demodulator unit B1 is described.

Referring to FIG. 4, a correlator 102 performs an operation for obtaining the first correlation values of the inphase component of the received signal RS input to an input end and the same code sequence as the first orthogonal code sequence used in the aforementioned modulator device 10, so as to output data having a high peak of the first correlation values as the first symbol. The correlator 102 also operates the quadrature component of the received signal RS and the same code sequence as the second orthogonal code sequence used in the aforementioned modulator device 10, so as to output data having a high peak of the operated second correlation values.

A multiplier 105 then operates the third correlation value of the first symbol and the same code sequence as the first Walsh-Code sequence "+−+−. . ." used in the aforementioned modulator device 10, so as to output the operated third correlation value as an inphase component of the supplemental channel signal. Also, the multiplier 105 operates the fourth correlation value of the second symbol with the second Walsh-Code sequence "+−+−. . ." used in the aforementioned modulator device 10, so as to output a quadrature component of the supplemental channel signal.

A correlator 103 operates, for a correlation period longer than that for the correlator 102, the in-phase component of the received signal RS input to the input end 101 and the first orthogonal code sequence, to thereby calculate the third correlation value. The correlator 103 then outputs data having a high peak value of the operated second correlation value as an in-phase component of the pilot channel signal. Also, the correlator 103 operates, for the correlation period longer than that in the correlator 102, the quadrature component of the received signal RS and the second orthogonal code sequence, to thereby calculate out the fourth correlation value. The correlator 103 then outputs data having a larger peak value of the operated third correlation value as a quadrature component of the pilot channel signal.

A propagation path estimator 104 calculates a moving average value of the inphase components of the pilot channel signal for a period corresponding to the length of N symbols. The propagation path estimator 104 outputs the calculated moving average value as an inphase component of a propagation path estimation value. In addition, the propagation path estimator 104 calculates a moving average value of the quadrature components of the pilot channel signal for the period corresponding to the length of N symbols. The obtained moving average value is output as a quadrature component of the propagation path estimation value.

The multiplier 106 multiplies the inphase component of the supplemental channel signal by that of the propagation path estimation value and also multiplies the quadrature component of the supplemental channel signal by that of the quadrature component of the propagation path estimation value. These multiplications respectively correct the amplitude component of the inphase and quadrature components of the supplemental channel signal affected by the characteristics of the propagation path. The multiplier 106 outputs the inphase and quadrature components of the supplemental channel signal that have been subjected to the above multiplications as a supplemental channel signal WS1.

The supplemental channel signal WS1 is supplied to a combining unit B14 for the channel signal 1 in a multi-path combined part B13 shown in FIG. 3.

The demodulator circuits B5–B12 work in a similar manner to that of the demodulator circuit B4. The demodulator circuit B7 outputs a supplemental channel signal WS2 in the path 2. The demodulator circuit B10 outputs a supplemental channel signal WS3 in the path N.

The demodulator circuit B5 outputs a fundamental channel signal WS4 in the path 1. The demodulator circuit B8 outputs a fundamental channel signal WS5 in the path 2. The demodulator circuit B11 outputs a fundamental channel signal WS6 in the path N.

In a case where there exists the channel signal N, the demodulator circuit B6 outputs the channel signal N WS7 in the path 1; the demodulator circuit B9 outputs the channel signal N WS8 in the path 2; and the demodulator circuit B12 outputs the channel signal N WS9 in the path N.

The combining unit B14 combines the supplemental channel signals WS1, WS2 and WS3 so as to output the combined supplemental channel signal having high reliability as a demodulation symbol CS1.

The combining unit B15 combines the fundamental channel signals WS4, WS5 and WS6 so as to output the combined fundamental channel signal having high reliability as a demodulation symbol CS2.

In the case where there exists the channel signal N, the combining unit B16 combines the channel signals N WS7, WS8 and WS9 so as to output the combined channel signal N having high reliability as a demodulation symbol CSN.

SUMMARY OF THE INVENTION

Therefore, it is an object of the present invention to provide a demodulator device and a demodulation method which overcome the above issues in the related art. More specifically, it is an object of the present invention to provide a demodulator device and a demodulation method that can demodulate transmitted information from a received signal by subjecting correlation values of the received signal and orthogonal codes to a simple add/subtraction operation, a sign inversion/non-inversion operation and accumulation. This object is achieved by combinations described in the independent claims. The dependent claims define further advantageous and exemplary combinations of the present invention.

According to the first aspect of the present invention, a demodulator device for demodulating a first transmitted symbol that is modulated into a first signal by spread spectrum modulation using a first code sequence and a second code sequence from a second signal including the first signal is provided. The first code sequence includes a first code series composed of a first code and a second code and a second code series composed of a third code and a fourth code, and the first code series is connected to the second code series in series. The demodulator device comprises: a first correlator operable to operate correlation values of the second signal and a third code sequence equal to the second code sequence, and add one of the adjacent ones of the correlation values to the other when the first code is equal to the second code or subtract one of the adjacent ones of the correlation values from the other when the first code is different from the second code, so as to output a first symbol; an inverter/non-inverter operable to non-inverting a sign of a value of the first symbol when the first code is equal to the third code or alternately non-inverting/inverting the sign of the value of the first symbol when the first code is different from the third code, so as to output a second symbol; and a rate adder operable to accumulate the second symbol the same number of times as a symbol rate of the first transmitted symbol to output a demodulation symbol.

The demodulator device may further includes a second correlator operable to operate correlation values of the second signal and a fourth code sequence to output first propagation path estimation values; a first propagation path estimator operable to calculate an average value of the first propagation path estimation values to output a second propagation path estimation value; and a first multiplier operable to multiply the first symbol and the second propagation path estimation value to supply a third symbol.

The demodulator device may further includes: a third correlator operable to operate correlation values of the second signal and a fifth code sequence equal to the second code sequence, and to add one of adjacent ones of the correlation values of the second signal and the fifth code sequence to the other when the first code is equal to the second code or to subtract one of the adjacent ones of the correlation values of the second signal and the fifth code sequence from the other when the first code is different from the second code, so as to output a fourth symbol; a fourth correlator operable to operate correlation values of the second signal and a sixth code sequence to output third propagation path estimation values; a second propagation path estimator operable to calculate an average value of the third propagation path estimation values to output a fourth propagation path estimation value; a second multiplier operable to multiply the fourth symbol by the fourth propagation path estimation value to output a fifth symbol; and a multi-path combiner operable to operate a value obtained by multi-path combination of the third symbol and the fifth symbol to supply a sixth symbol to the inverter/non-inverter.

In the demodulator device, the first code sequence may be a Walsh-Code sequence, and the second code sequence may be composed of a PN (Pseudorandom Noise)-Code sequence.

According to the second aspect of the present invention, a demodulation method for demodulating a first transmitted symbol that is modulated into a first signal by spread spectrum modulation using a first code sequence and a second code sequence from a second signal including the first signal is provided. The first code sequence includes a first code series composed of a first code and a second code and a second code series composed of a third code and a fourth code, and the first code series and the second code series are connected in series. The demodulation method comprises: the first step of operating correlation values of the second signal and a third code sequence equal to the second code sequence, and adding one of adjacent ones of the correlation values to the other when the first code is equal to the second code or subtracting one of the adjacent ones of the correlation values from the other when the first code is different from the second code, so as to output a first symbol; the second step of non-inverting a sign of a value of the first symbol when the first code is equal to the third symbol or alternately inverting/non-inverting the sign of the value of the first symbol when the first code is different from the third code, to output a second symbol; and the third step of accumulating the second symbol the same number of times as a symbol rate of the first transmitted symbol to output a demodulation symbol.

The demodulation method may further include: the fourth step of operating correlation values of the second signal and a fourth code sequence to output first propagation path estimation values; the fifth step of calculating an average value of the first propagation path estimation values to output a second propagation path estimation value; and the sixth step of multiplying the first symbol by the second propagation path estimation value to supply a third symbol to the second step.

The demodulation method may further include: the seventh step of operating correlation values of the second signal and a fifth code sequence equal to the second code sequence, and adding one of adjacent ones of the correlation values of the second signal and the fifth code sequence to the other when the first code is equal to the second code or subtracting one of the adjacent ones of the correlation values form the other when the first code is different from the second code, so as to output a fourth symbol; the eighth step of operating correlation values of the second signal and a sixth code sequence to output third propagation path estimation values; the ninth step of calculating an average value of the third propagation path estimation values to output a fourth propagation path estimation value; the tenth step of multiplying the fourth symbol by the fourth propagation path estimation value to output a fifth symbol; and the eleventh step of operating a value obtained by multi-path combination of the third symbol and the fifth symbol to supply a sixth symbol to the third step.

In the demodulation method, the first code sequence may be a Walsh-Code sequence, and the second code sequence may be a code sequence composed of a PN (Pseudorandom-Noise)-Code sequence.

This summary of the invention does not necessarily describe all necessary features of the present invention. The present invention may also be a sub-combination of the above described features. The above and other features and advantages of the present invention will become more apparent from the following description of embodiments taken in conjunction with the accompanying drawings.

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention.

A demodulator device according to an embodiment of the present invention can demodulate two channel signals, i.e., a supplemental channel signal and a fundamental channel signal.

The demodulator device performs an operation for obtaining symbols respectively corresponding to fingers (paths) from received signals in the respective fingers (paths) by correlation using the same code sequence as an orthogonal code sequence used in a transmitter and an add/subtraction operation. The demodulator device then combines the operated symbols. Next, the demodulator device inverts/non-inverts values of the combined symbols by using the same code sequence as the Walsh-Code sequence used in the transmitter. Then, the demodulator device extracts the symbols that have been subjected to inversion/non-inversion for each channel signal, thereby the demodulator device demodulates information of a desired channel signal from the desired channel signal extracted.

The demodulator device is described below, referring to the accompanying drawings.

Figure 1:
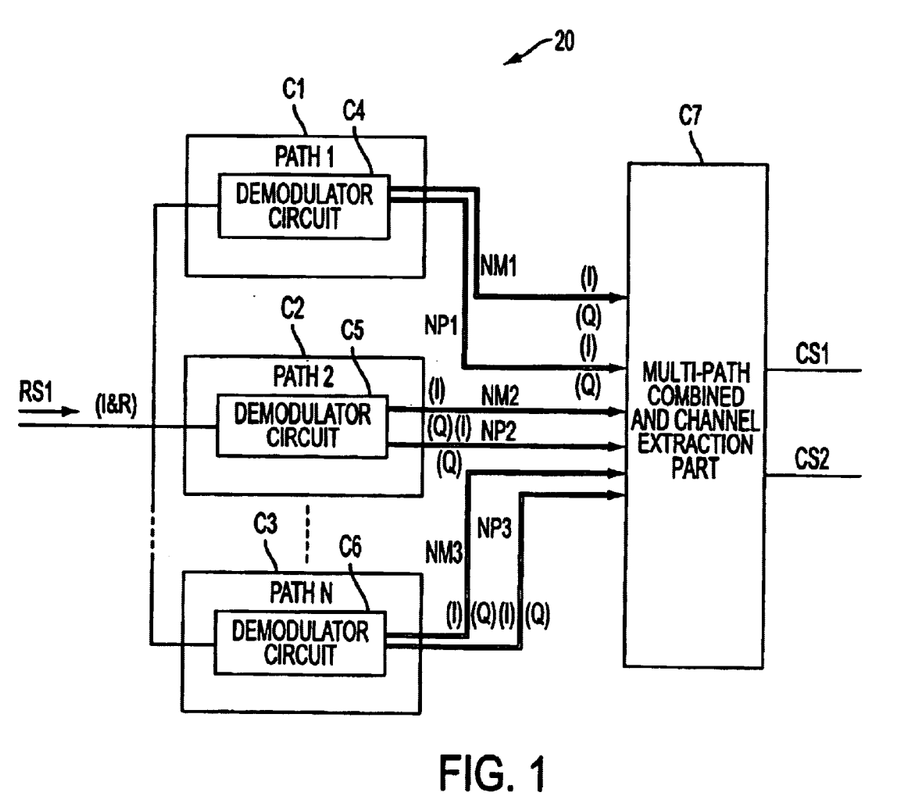
FIG. 1 is schematic block diagram showing an entire structure of a demodulator device according to an embodiment of the present invention.

(A-1) Structure of the demodulator device according to an embodiment of the present invention FIG. 1 shows a structure of a demodulator device 20 according to the present embodiment.

The demodulator device 20 is incorporated in a receiver like the aforementioned demodulator device 11. The demodulator device 20 receives as a received signal RS1 a transmitted signal TS1 transmitted from the transmitter having the modulator device 10 shown in FIG. 2.

The transmitted signal TS1 used in the present embodiment is the same signal as the aforementioned transmitted signal TS. Also, the received signal RS1 in the present embodiment is the same signal as the aforementioned received signal RS. The received signal RS1 has passed through a propagation path composed of a multi-path fazing environment. In the present embodiment, the aforementioned pilot channel signal is used only for estimating the propagation path.

Referring to FIG. 1, the demodulator device 20 includes path demodulation units C1, C2 and C3 and a multi-path combined and channel extraction part C7. The path demodulation units C1, C2 and C3 correspond to paths 1, 2 and N of the received signal RS1, respectively.

The path demodulation units C1, C2 and C3 include demodulator circuits C4, C5 and C6, respectively.

Figure 5:
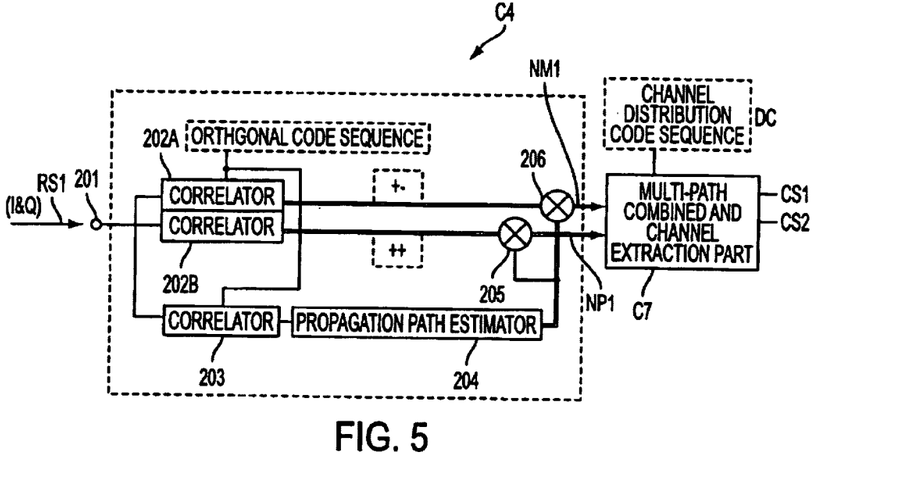
FIG. 5 is a schematic block diagram showing a structure of a demodulator circuit according to the embodiment of the present invention.

The demodulator circuit C4 has a structure shown in FIG. 5. This demodulator circuit C4 has a quite different function from that of the conventional demodulator circuits B4–B12 mentioned above. Please note that the structure of the demodulator circuits C5 and C6 are the same as that of the demodulator circuit C4. Also, the demodulator circuits C5 and C6 have the same functions as the demodulator circuit C4.

(A-1-1) Structure of the demodulator circuit

Referring to FIG. 5, the demodulator circuit C4 includes an input end 201, correlators 202A, 202B and 203, a propagation path estimator 204, and multipliers 205 and 206.

The correlator 202A performs a pre-operation for demodulating information of the supplemental channel signal. The correlator 202B performs a pre-operation for demodulating information of the fundamental channel signal. Functions of the correlators 202A and 202B described below are the same as that of the correlator 102 (see FIG. 4).

The correlator 202A operates first correlation values of an inphase component of the received signal RS1 input to the input end 101 and the same code sequence as the first orthogonal code sequence used in the aforementioned modulator device 10, so that the correlator 202A outputs data having a high peak of the operated first correlation values as a first symbol. In addition, the correlator 202A operates second correlation values of a quadrature component of the received signal RS1 input to the input end 101 and the same code sequence as the second orthogonal code sequence used in the aforementioned second modulator device 10. The correlator 202A outputs data having a high peak of the operated second correlation values as a second symbol.

The correlator 202B operates third correlation values of the inphase component of the received signal RS1 input to the input end 101 and the same code sequence as the first orthogonal code sequence used in the aforementioned modulator device 10. The correlator 202B outputs data having a high peak of the thus operated third correlation values as a third symbol. The correlator 202B also operates fourth correlation values of the quadrature component of the received signal RS1 and the same code sequence as the second orthogonal code sequence used in the modulator device 10. The correlator 202B outputs data having a high peak of the thus operated fourth correlation values as a fourth symbol.

The following function of the correlator 202A (or the correlator 202B) is different from that of the correlator 102 (See FIG. 4). The operation described here is a part of operations in the correlator 105 (see FIG. 4), that is an operation for obtaining a partial correlation value. In the present embodiment, the operations by the correlator 105 (FIG. 4) are realized by this operation and operations by an invertor/non-invertor 212 and a rate adder 213 described later. In this operation, one of two adjacent symbols is added to the other (or one symbol is subtracted from the other); the invertor/non-invertor 212 inverts/non-inverts the sign of the resultant symbol; and the rate adder 213 accumulates the inverted/non-inverted symbol.

More specifically, this operation is processed in the correlator 202A as follows. The first Walsh-Code sequence "+−+−" used in the modulator device 10 is a code sequence obtained by connecting the first code series "+−" and the second code series "+−" in series. For example, the first Walsh-Code sequence may be composed of components in the second column of a 4×4 Walsh-Hadamard matrix. The correlation values of the symbol and the first code series is equal to a value obtained by subtracting the symbol corresponding to the second value "−" of the first code series from the symbol corresponding to the first value "+" of the first code series. Also, the correlation value of the symbol and the second code series is equal to the symbol corresponding to the second value "−" of the second code series from the symbol corresponding to the first value "+" of the second code series.

The correlator 202A subtracts one of two adjacent first symbols from the other, and outputs a value obtained by the subtraction as a fifth symbol. Values of the fifth symbol are equal to correlation values of the inphase component of the received signal RS1 and the first code series. Similarly, the values of the fifth symbols are equal to correlation values of the inphase component of the received signal RS1 and the second code series.

The correlator 202A subtracts one of two adjacent second symbols from the other, and outputs a value obtained by the subtraction as a sixth symbol. Values of the sixth symbol are equal to correlation values of the quadrature component of the received signal RS1 and the first code series. Similarly, the values of the sixth symbols are equal to correlation values of the quadrature component of the received signal RS1 and the second code series.

In addition, this operation is processed in the second correlator 202B. The second Walsh-Code sequence "++−−" used in the modulator device 10 is a code sequence obtained by connecting a third code series "++" and a fourth code series "−−" in series. For example, the second Walsh-Code sequence may be composed of components in the third column of a 4×4 Walsh-Hadamard matrix. A correlation value of the symbol and the third code series is equal to a value obtained by adding the symbol corresponding to the first value "+" of the third code series and the second value "+" of the third code series. Also, a correlation value of the symbol and the fourth code series is equal to a value obtained by inverting the sign of an added value of the symbol corresponding to the first value "−" of the fourth code series and the symbol corresponding to the second value "−" of the fourth code series.

The correlator 202B adds one of two adjacent third symbols to the other, and then outputs an added value as a seventh symbol. The seventh symbol is equal to a correlation value of the inphase component of the received signal RS1 and the third code series, or a value obtained by inverting the sign of the seventh symbol (the seventh symbol×(−1)) is equal to a correlation value of the inphase component of the received signal RS1 and the fourth code series.

Moreover, the correlator 202B adds one of two adjacent fourth symbols to the other, and then outputs an added value as an eighth symbol. The value of the eighth symbol is equal to a correlation value of the quadrature component of the received signal RS1 and the third code series, or a value obtained by inverting the sign of the eighth symbol (the eighth symbol×(−1)) is equal to the correlation value of the quadrature component of the received signal RS1 and the fourth code series.

The correlator 203 is the same as the correlator 103 (FIG. 4). The correlator 203 operates correlation values of the inphase component of the received signal RS1 input to the input end 201 and the first orthogonal code sequence for a correlation period longer than that for the correlator 202A. The correlator 203 outputs data having a high peak value of the thus operated correlation values as an inphase component of the pilot channel signal. The correlator 203 also operates correlation values of the quadrature component of the received signal RS1 and the second orthogonal code sequence for a correlation period longer than that for the correlator 202B. The correlator 203 outputs data having a high peak value of the thus operated correlation values as a quadrature component of the pilot channel signal.

The propagation path estimator 204 is the same as the propagation path estimator 104 described associated with FIG. 4. The propagation path estimator 204 calculates a moving average value of the inphase components of the pilot channel signal for a period corresponding to the length of N symbols. The propagation path estimator 204 outputs the calculated moving average value as an inphase component of the propagation path estimation value. Also, the propagation path estimator 204 calculates a moving average value of the quadrature components of the pilot channel signal for the period corresponding to the length of N symbols, so as to output the calculated moving average value as a quadrature component of the propagation path estimation value.

The multiplier 205 multiplies the fifth symbol by the inphase component of the propagation path estimation value, thereby correcting the fifth symbol affected by the characteristics of the propagation path. The corrected fifth symbol is referred to as a ninth symbol. Moreover, the multiplier 205 multiplies the sixth symbol by the quadrature component of the propagation path estimation value, thereby correcting the sixth symbol affected by the characteristics of the propagation path. The corrected sixth symbol is referred to as a tenth symbol. The multiplier 205 outputs the ninth and tenth symbols as a symbol NM1.

The multiplier 206 multiplies the seventh symbol by the inphase component of the propagation path estimation value, thereby correcting the seventh symbol affected by the characteristics of the propagation path. The corrected seventh symbol is referred to as an eleventh symbol. Moreover, the multiplier 206 multiplies the eighth symbol by the quadrature component of the propagation path estimation value, thereby correcting the eighth symbol affected by the characteristics of the propagation path. The corrected eighth symbol is referred to as a twelfth symbol. The multiplier 206 outputs the eleventh and twelfth symbols as a symbol NP1.

The symbols NM1 and NP1 are output from the demodulator circuit C4 and are supplied to the multi-path combined and channel extraction part C7.

Similarly, the demodulator circuit C5 supplies symbols NM2 and NP2 to the multi-path combined and channel extraction part C7. The symbol NM2 corresponds to the symbol NM1 in the path 1 and is composed of thirteenth and fourteenth symbols that correspond to the ninth and tenth symbols in the path 1, respectively. The symbol NP2 corresponds to the symbol NP1 in the path 1 and is composed of fifteenth and sixteenth symbols that correspond to the eleventh and twelfth symbols in the path 1, respectively.

Also, the demodulator circuit C6 supplies symbols NM3 and NP3 to the multi-path combined and channel extraction part C7. The symbol NM3 corresponds to the symbol NM1 in the path 1 and is composed of seventeenth and eighteenth symbols that correspond to the ninth and tenth symbols in the path 1, respectively. The symbol NP3 corresponds to the symbol NP1 in the path 1 and is composed of nineteenth and twentieth symbols that correspond to the eleventh and twelfth symbols in the path 1, respectively.

Figure 6:
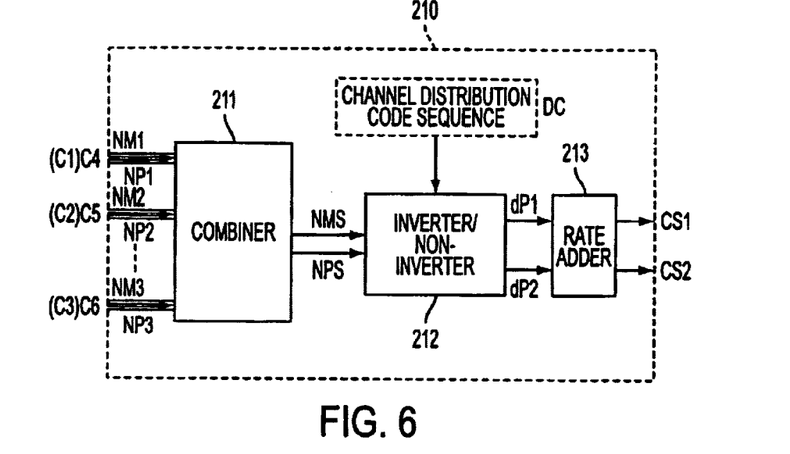
FIG. 6 is a schematic block diagram showing an internal structure of a multi-path combined and channel extraction part according to the embodiment of the present invention.

The multi-path combined and channel extraction part C7 operates a symbol obtained by multi-path combination of the symbols NM1, NM2 and NM3, and then extracts information of the supplemental channel signal from the operated signal. Similarly, the multi-path combined and channel extraction part C7 operates a symbol obtained by multi-path combination of the symbols NP1, NP2 and NP3, and then extracts information of the fundamental channel signal from the operated signal. FIG. 6 shows the structure of the multi-path combined and channel extraction part C7.

(A-1-2) Structure of the multi-path combined and channel extraction part

The multi-path combined and channel extraction part C7 includes a combiner 211, the inverter/non-inverter 212 and the rate adder 213, as shown in FIG. 6.

The combiner 211 operates a symbol by multi-path combination of a plurality of signals input thereto. In the present embodiment, the combiner 211 operates the symbol obtained by multi-path combination of the symbols NM1, NM2 and NM3. The obtained symbol NMS is supplied from the combiner 211 to the inverter/non-inverter 212. Also, the combiner 211 operates the symbol obtained by multi-path combination of the symbols NP1, NP2 and NP3. The obtained symbol NPS is supplied from the combiner 211 to the inverter/non-inverter 212.

For example, the multi-path combination for obtaining the symbol NMS uses the eleventh and twelfth symbols in the symbol NM1, the fifteenth and sixteenth symbols in the symbol NM2, and the nineteenth and twentieth symbols in the symbol NM3. All of these symbols are added.

The multi-path combination for obtaining the symbol NPS uses the ninth and tenth symbols in the symbol NP1, the thirteenth and fourteenth symbols in the symbol NP2, and the seventeenth and eighteenth symbols in the symbol NP3. All of these symbols are added.

The inverter/non-inverter 212 inverts/non-inverts the sign of the symbol NMS by using a first channel distribution code sequence DC corresponding to the first Walsh-Code sequence used in the modulator device 10. One of the two adjacent symbols NMS corresponds to the correlation value of the first code series, while the other corresponds to the correlation value of the second code series. A value obtained by adding the correlation value composed of the first code series and the correlation value composed of the second code series corresponds to a correlation value composed of the first Walsh-Code sequence.

The rate adder 213 described later accumulates signals input thereto. Since the sign of the symbol NMS composed of the first code series has to be non-inverted in the inverter/ non-inverter 21, the first code in the first channel distribution code sequence DC, that corresponds to the symbol NMS composed of the first code series, is "+". In addition, since the sign of the symbol NMS composed of the second code series has to be non-inverted, the second code in the first channel distribution code sequence DC, that corresponds to the symbol NMS composed of the second code series, is "+". Thus, the first channel distribution code sequence DC is a sequence of "++".

The inverter/non-inverter 212 leaves the sign of the symbol NMS composed of the first code series non-inverted by the first code in the first channel distribution code sequence DC, and also leaves the sign of the symbol NMS composed of the second code series non-inverted. Then, the inverter/non-inverter 212 extracts the supplemental channel signal from the non-inverted symbols NMS, so as to output the extracted channel signal as a demodulation process symbol dp1.

The inverter/non-inverter 212 inverts/non-inverts the sign of the symbol NPS by using a second channel distribution code sequence corresponding to the second Walsh-Code sequence used in the modulator device 10. One of the two adjacent symbols NPS corresponds to the correlation value of the third code series, while the other symbol NPS corresponds to the correlation value of the fourth code series. A value obtained by subtracting the correlation value composed of the fourth code series from the correlation value composed of the third code series corresponds to a correlation value composed of the second Walsh-Code sequence.

The rate adder 213 described later accumulates signals input thereto. Since the sign of the symbol NPS composed of the third code series has to be non-inverted in the inverter/non-inverter 21, the first code in the second channel distribution code sequence DC, that corresponds to the symbol NPS composed of the third code series, is "+". In addition, since the sign of the symbol NPS composed of the fourth code series has to be inverted, the second code in the second channel distribution code sequence DC, that corresponds to the sign of the symbol NPS composed of the fourth code series, is "−". Thus, the second channel distribution code sequence DC is a sequence of "+−".

The inverter/non-inverter 212 leaves the sign of the symbol NPS composed of the third code series non-inverted by the first code in the second channel distribution code sequence DC, and inverts the sign of the symbol NPS composed of the fourth code series by the second code in the second channel distribution code sequence DC. Then, the inverter/non-inverter 212 extracts the fundamental channel signal from the inverted/non-inverted symbols NPS, so as to output the extracted channel signal as a demodulation process symbol dp2.

The rate adder 213 accumulates the demodulation process symbol dp1 in accordance with the rate of the supplemental channel signal, so that the accumulated signals are output as demodulation symbols CS1 (that is, information of the supplemental channel signal). Also, the rate adder 213 accumulates the demodulation process symbol dp2 in accordance with the rate of the fundamental channel signal, so that the accumulated signals are output as demodulation symbols CS2 (that is, information of the fundamental channel signal). The operation in the present embodiment is described referring to FIGS. 5, 6 and 7.

(A-2) Operation in the embodiment

In FIG. 5, the received signal RS1 is input to the correlators 202A and 202B via the input terminal 201 of the demodulator circuit C4 in the path 1.

In the correlator 202A, the correlation value of the inphase component of the received signal RS1 and the first orthogonal code sequence is operated, thereby the first symbol is obtained. One of two adjacent first symbols is subtracted from the other, so that the fifth symbol is obtained. In addition, the correlation value of the quadrature component of the received signal RS1 and the first orthogonal code sequence is operated, thereby the second symbol is obtained. Then, one of two adjacent second symbols is subtracted from the other, so that the sixth symbol is obtained.

In the correlator 202B, the correlation value of the inphase component of the received signal RS1 and the second orthogonal code sequence is operated, thereby the third symbol is obtained. One of two adjacent third symbols is added to the other, so that the seventh symbol is obtained. In addition, the correlation value of the quadrature component of the received signal RS1 and the second orthogonal code sequence is operated, thereby the fourth symbol is obtained. Then, one of two adjacent fourth symbols is added to the other, so that the eighth symbol is obtained.

The correlator 203 operates the correlation value of the inphase component of the received signal RS1 and the first orthogonal code sequence for a correlation period longer than that for the correlator 202A. Among the correlation values operated, data having a high peak is output as the inphase component of the pilot channel signal. Also, the correlator 203 operates the correlation value of the inphase component of the received signal RS1 and the second orthogonal code sequence for a correlation period longer than that for the correlator 202B. Among the correlation values operated, data having a high peak is output as the quadrature component of the pilot channel signal.

The propagation path estimator 204 calculates the moving average value of the inphase component of the pilot channel signal for a period corresponding to the length of N symbols. The calculated moving average value is output as the inphase component of the propagation path estimation value. Also, for the period corresponding to the length of N symbols, the moving average value of the quadrature component of the pilot channel signal is calculated. The calculated moving average value is output as the quadrature component of the propagation path estimation value.

The multiplier 205 multiplies the fifth symbol by the inphase component of the propagation path estimation value output from the propagation path estimator 204, thereby the ninth symbol having high reliability is obtained. Also, the multiplier 205 multiplies the sixth symbol by the quadrature component of the propagation path estimation value output from the propagation path estimator 204, thereby the tenth symbol having high reliability is obtained.

The multiplier 206 multiplies the seventh symbol by the inphase component of the propagation path estimation value output from the propagation path estimator 204, thereby the eleventh symbol is obtained. Moreover, the multiplier 206 multiplies the eighth symbol by the quadrature component of the propagation path estimation value output from the propagation path estimator 204, thereby the twelfth symbol with high reliability is obtained.

Referring to FIG. 1, in the demodulator circuit C4 for the path 1, the symbol NM1 composed of the ninth and tenth symbols is supplied to the multi-path combined and channel extracting part C7. Also, the symbol NP1 composed of the eleventh and twelfth symbols is supplied to the multi-path combined and channel extracting part C7.

The received signal RS1 is input to the demodulator circuit C5 for the path 2. In the demodulator circuit C5, the symbol NM2 composed of the thirteenth and fourteenth symbols and the symbol NP2 composed of the fifteenth and sixteenth symbols are obtained. The thirteenth, fourteenth, fifteenth and sixteenth symbols correspond to the ninth, tenth, eleventh and twelfth symbols in the path 1. The symbols NM2 and NP2 are supplied to the multi-path combined and channel extracting part C7.

The received signal RS1 is also input to the demodulator circuit. The symbol NM3 composed of the seventeenth and eighteenth and the symbol NP3 composed of the nineteenth and twentieth are obtained. The seventeenth for the path N. In the demodulator circuit C6, the symbol nth, eighteenth, nineteenth and twentieth symbols correspond to the ninth, tenth, eleventh and twelfth symbols in the path 1. The symbols NM3 and NP3 are supplied to the multi-path combined and channel extraction part C7.

Referring to FIG. 6, the symbols NM1, NM2 and NM3 supplied to the multi-path combined and channel extraction part C7 are input to the combiner 211. The symbols NP1, NP2 and NP3 supplied to the multi-path combined and channel extraction part C7 are also input to the combiner 211.

The combiner 211 performs multi-path combination of the ninth and tenth symbols of the symbol NM1, the thirteenth and fourteenth symbols of the symbol NM2 and the seventeenth and eighteenth symbols of the symbol NM3, thereby the symbol NMS is obtained. The symbol NMS is output to the inverter/non-inverter 212.

The combiner 211 performs multi-path combination of the eleventh and twelfth symbols of the symbol NP1, the fifteenth and sixteenth symbols of the symbol NP2 and the nineteenth and twentieth symbols of the symbol NP3, thereby the symbol NPS is obtained. The symbol NPS is output to the inverter/non-inverter 212.

For example, the operation for the above symbols performed by the combiner 211 is addition.

In the inverter/non-inerter 212, the sign of the symbol NMS is processed in the following manner. The sign of the symbol NMS composed of the first code series of the first Walsh-Code sequence is left non-inverted by the first code "+" in the first channel distribution code sequence DC, so that the demodulation process symbol dp1 is obtained. The sign of the symbol NMS composed of the second code series of the first Walsh-Code sequence is left non-inverted by the second code "+" in the first channel distribution code sequence DC, so that the demodulation process symbol dp1 is obtained. The obtained demodulation process symbols dp1 are output to the rate adder 213.

In the inverter/non-inerter 212, the sign of the symbol NPS is processed in the following manner. The sign of the symbol NPS composed of the third code series in the second Walsh-Code sequence is left non-inverted by the first code "+" in the second channel distribution code sequence DC, so that the demodulation process symbol dp2 is obtained. The sign of the symbol NPS composed of the fourth code series in the second Walsh-Code sequence is inverted by the second code "−" in the second channel distribution code sequence DC, so that the demodulation process symbol dp2 is obtained. The obtained demodulation process symbols dp2 are output to the rate adder 213. The above operation is described referring to FIG. 7.

In the rate adder 213, the demodulation process symbols dp1 are signals used as a basis of the demodulation symbols CS1 (corresponding to the information of the supplemental channel signal). The same number of the demodulation process symbols dp1 as the number of the symbols of a desired channel signal (supplemental channel signal) are accumulated, so that the accumulated demodulation process symbols dp1 are demodulated into the demodulation symbols CS1 of the desired channel. The demodulation symbols CS1 are output from the rate adder 213.

In the rate adder 213, the demodulation process symbols dp2 are signals used as a basis of the demodulation symbols CS2 (corresponding to the information of the fundamental channel signal). The same number of the demodulation process symbols dp2 as the number of the symbols of a desired channel signal (fundamental channel signal) are accumulated, so that the accumulated demodulation process symbols dp2 are demodulated into the demodulation symbols CS2 of the desired channel. The demodulation symbols CS2 are output from the rate adder 213.

Figure 7:
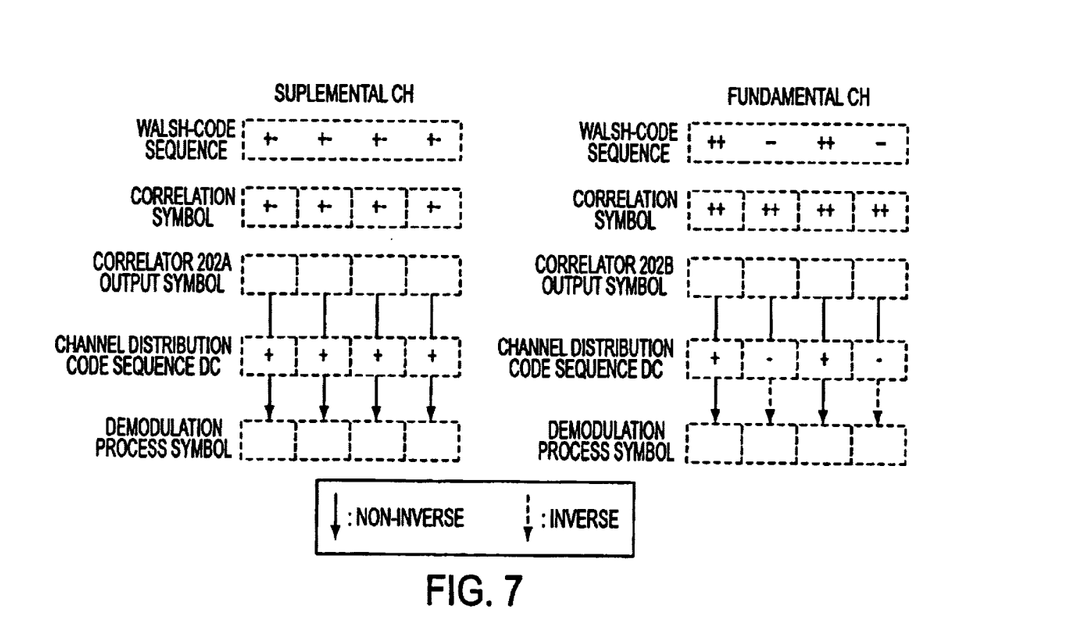
FIG. 7 is a diagram for explaining an operation in the embodiment of the present invention.

Next, the operation of the inverter/non-inverter 212 is described referring to FIG. 7. In a case of the standard in conformity to IS-2000, the fifth symbol output from the correlator 202A associated with the channel signal 1 (supplemental channel signal) corresponds to the correlation value of the inphase component of the channel signal and the first code series "+−" in the first Walsh-Code sequence or the inphase component of the received signal RS and the second code series "+−" in the first Walsh-Code sequence because of the relationship between the transmitter and the receiver according to IS-2000 standard. (The inphase component of the channel signal is a signal composed of the inphase component of the supplemental channel signal, that of the fundamental channel signal and that of the pilot channel signal.)

The sixth symbol output from the correlator 202A corresponds to the correlation value of the quadrature component of the received signal RS1 and the first code series "+−" in the first Walsh-Code sequence or the correlation value of the received signal RS1 and the second code series "+−" in the first Walsh-Code sequence. The fifth symbol output from the correlator 202A is obtained by subtracting one of the two adjacent first symbols from the other. The sixth symbol output from the correlator 202A is obtained by subtracting one of the two adjacent second symbols from the other.

In FIG. 5, a mark "+−" denoting a signal output from the correlator 202A means the fifth symbol obtained by subtracting the first symbol corresponding to the second code in the first code series from the first symbol corresponding to the first code in the first code series, or the sixth symbol obtained by subtracting the second symbol corresponding to the second code in the second code series from the second symbol corresponding to the first code in the second code series.

The seventh symbol output from the correlator 202B associated with the channel signal 2 (fundamental channel signal) corresponds to the correlation value of the quadrature component of the channel signal and the third code series "++" in the second Walsh-Code sequence or a value obtained by inverting the sign of the correlation value of the inphase component of the received signal RS and the fourth code series "−−" in the second Walsh-Code sequence. (The quadrature component of the channel signal is a signal composed of the quadrature component of the supplemental channel signal, that of the fundamental channel signal and that of the pilot channel signal.)

The eighth symbol output from the correlator 202B corresponds to the correlation value of the quadrature component of the received signal RS1 and the third code series "++" in the second Walsh-Code sequence or a value obtained by inverting the sign of the correlation value of the received signal RS1 and the fourth code series "−−" in the second Walsh-Code sequence. The seventh symbol output from the correlator 202B is obtained by adding one of the two adjacent third symbols to the other. The eighth symbol output from the correlator 202B is obtained by adding one of the two adjacent fourth symbols to the other.

In FIG. 5, a mark "++" denoting a signal output from the correlator 202B means the seventh symbol obtained by adding the third symbol corresponding to the second code in the third code series to the third symbol corresponding to the first code in the third code series, or the eighth symbol obtained by subtracting the fourth symbol corresponding to the second code in the fourth code series from the fourth symbol corresponding to the first code in the fourth code series.

The first channel distribution code sequence DC is a code sequence for inverting/non-inverting the sign of the symbol NPS in the inverter/non-inverter 212. The symbol NPS is a signal generated based on the symbols "+−" output from the correlator 202A. More specifically, the symbol NPS is a signal composed of the first code series in the first Walsh-Code sequence or a signal composed of the second code series in the first Walsh-Code sequence. A signal obtained by adding the symbol NPS composed of the first code series to the symbol NPS composed of the second code series is equal to the correlation value of the signals and the first Walsh-Code sequence. The rate adder 213 accumulates the signals output from the inverter/non-inverter 212.

Therefore, the first channel distribution code sequence DC becomes a signal "+" for non-inverting the sign of the symbol NPS composed of the first code series. For the symbol NPS composed of the second code series, the first channel distribution code sequence DC becomes a signal "+" for non-inverting the sign of the symbol NPS composed of the second code series.

The inverter/non-inverter 212 leaves the symbol NPS composed of the first code series non-inverted by the first channel distribution code sequence, thereby the demodulation process symbol dp1 of the channel 1 is obtained. In addition, the inverter/non-inverter 212 leaves the symbol NPS composed of the second code series non-inverted by the first channel distribution code sequence, thereby the demodulation process symbol dp1 of the channel 1 is obtained.

The second channel distribution code sequence DC is a code sequence for inverting/non-inverting the sign of the symbol NMS in the inverter/non-inverter 212. The symbol NMS is a signal generated based on the symbols "++" output from the correlator 202B. More specifically, the symbol NMS is a signal composed of the third code series in the second Walsh-Code sequence or a signal composed of the fourth code series in the second Walsh-Code sequence. A signal obtained by subtracting the symbol NMS composed of the fourth code series from the symbol NMS composed of the third code series is equal to the correlation value of the signals and the second Walsh-Code sequence. The rate adder 213 accumulates the signals output from the inverter/non-inverter 212.

Therefore, for the symbol NMS composed of the third code series, the second channel distribution code sequence DC becomes a signal "+" for leaving the sign of the symbol NMS composed of the third code series non-inverted. For the symbol NMS composed of the fourth code series, the second channel distribution code sequence DC becomes a signal "−" for inverting the sign of the symbol NMS composed of the fourth code series.

The inverter/non-inverter 212 leaves the symbol NMS composed of the third code series non-inverted by the second channel distribution code sequence, thereby the demodulation process symbol dp2 of the channel 2 is obtained. In addition, the inverter/non-inverter 212 inverts the symbol NMS composed of the fourth code series by the second channel distribution code sequence, thereby the demodulation process symbol dp2 of the channel 2 is obtained. In FIG. 7, an arrow by solid line shows non-inversion while an arrow by broken line shows inversion.

Finally, the rate adder 213 accumulates the same number of the demodulation process symbols dp1 as the number of the symbols of the supplemental channel signal, and outputs the demodulated information of the desired channel signal CS1 (the information of the supplemental channel signal). The rate adder 213 accumulates the same number of the demodulation process symbols dp2 as the number of the symbols of the fundamental channel signal, and outputs the demodulated information of the desired channel signal CS2 (the information of the fundamental channel signal)

As described above, the present embodiment can realize the same functions as the functions realized by the conventional technique. In particular, the present embodiment realizes a smaller circuit than the conventional circuit. Also, the present embodiment realizes a circuit having a smaller power consumption than that of the conventional circuit.

(B) Other embodiment

In the above embodiment, the Walsh-Code sequence is used as an example. However, the present invention can use code sequences having regularity other than the Walsh-Code sequence.

In the above embodiment, the PN-Code sequence is used as an example. However, the present invention can use code sequences of binary codes such as Gold-code sequence and Walsh-Code sequence.

Moreover, the above embodiment describes a case where the received signal RS1 (transmitted signal TS1) has two information channels. However, the present invention can be adopted in a case where the received signal RS1 (transmitted signal TS1) has three or more information channels.

Although the above embodiment describes a case where the number of the paths N is three, the number of the paths can be less or more than three.

The above embodiment describes a case where a series of demodulating operations are implemented by hardware. However, the series of demodulating operations may be implemented by software.

Although the present invention has been described by way of exemplary embodiments, it should be understood that many changes and substitutions may be made by those skilled in the art without departing from the spirit and the scope of the present invention which is defined only by the appended claims.

What is claimed is:

1. A demodulator device for demodulating a first transmitted symbol that is modulated into a first signal by spread spectrum modulation using a first code sequence and a second code sequence from a second signal including the first signal, the first code sequence including a first code series composed of a first code and a second code and a second code series composed of a third code and a fourth code, the first code series being connected to the second code series in series, the demodulator device comprising:

a first correlator for generating correlation values of the second signal and a third code sequence equal to the second code sequence, said first correlator either adding one of the adjacent ones of the correlation values to the other when the first code is equal to the second code or subtracting one of the adjacent ones of the correlation values from the other when the first code is different from the second code, said first correlator outputting a first symbol;

an inverter/non-inverter either non-inverting a sign of a value of the first symbol when the first code is equal to the third code or alternately inverting the sign of the value of the first symbol when the first code is different from the third code, said inverter/non-inverter outputting a second symbol; and a rate adder accumulating the second symbol to output a demodulation symbol.

2. A demodulator device as claimed in claim 1, further comprising:

a second correlator for generating correlation values of the second signal and a fourth code sequence to output first propagation path estimation values;

a first propagation path estimator calculating an average value of the first propagation path estimation values to out put a signal propagation path estimation value; and a first multiplier multiplying the first symbol and the signal propagation path estimation value, said first multiplier supplying a third symbol to said inverter/non-inverter.

3. A demodulator device as claimed in claim 1, wherein said first code sequence is a Walsh-Code sequence.

4. A demodulator device as claimed in claim 1, wherein said second code sequence is composed of a PN (Pseudorandom Noise)-Code sequence.

5. A demodulation method for demodulating a first transmitted symbol that is modulated into a first signal by spread spectrum modulation using a first code sequence and a second code sequence from a second signal including the first signal, the first code sequence including a first code series composed of a first code and a second code and a second code series composed of a third code and a fourth code, the first code series and the second code series being connected in series, the method comprising:

a first step of generating correlation values of the second signal and a third code sequence equal to the second code sequence, and adding one of adjacent ones of the correlation values to the other when the first code is equal to the second code or subtracting one of the adjacent ones of the correlation values from the other when the first code is different from the second code, said first step outputting a first symbol;

a second step of non-inverting a sign of a value of the first symbol when the first code is equal to the third symbol or alternately inverting the sign of the value of the first symbol when the first code is different from the third code, said second step outputting a second symbol; and a third step of accumulating the second symbol, said third step outputting a demodulation symbol.

6. A demodulation method as claimed in claim 5, further comprising:

a fourth step of generating-correlation values of the second signal and a fourth code sequence to output first propagation path estimation values;

a fifth step of calculating an average value of the first propagation path estimation values and outputting a signal propagation path estimation value; and a sixth step of multiplying the first symbol by the signal propagation path estimation value and supplying a third symbol to said second step.

7. A demodulation method as claimed in claim 5, wherein the first code sequence is a Walsh-Code sequence.

8. A demodulation method as claimed in claim 5, wherein the second code sequence is a code sequence composed of a PN (Pseudorandom-Noise)-Code sequence.

* * * * *